United States Patent
Ge et al.

(10) Patent No.: US 12,053,885 B2
(45) Date of Patent: Aug. 6, 2024

(54) CONTROL METHOD FOR ROBOT, COMPUTER-READABLE STORAGE MEDIUM AND ROBOT

(71) Applicant: UBTECH ROBOTICS CORP LTD, Shenzhen (CN)

(72) Inventors: Ligang Ge, Shenzhen (CN); Yizhang Liu, Shenzhen (CN); Chunyu Chen, Shenzhen (CN); Zheng Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 368 days.

(21) Appl. No.: 17/561,629

(22) Filed: Dec. 23, 2021

(65) Prior Publication Data

US 2022/0203522 A1    Jun. 30, 2022

(30) Foreign Application Priority Data

Dec. 24, 2020   (CN) .......................... 202011551333.5

(51) Int. Cl.
| | |
|---|---|
| *B25J 9/16* | (2006.01) |
| *B62D 57/02* | (2006.01) |
| *B62D 57/032* | (2006.01) |
| *G05D 1/08* | (2006.01) |

(52) U.S. Cl.
CPC ........... *B25J 9/1602* (2013.01); *B25J 9/1633* (2013.01); *B62D 57/02* (2013.01)

(58) Field of Classification Search
CPC ...... B25J 9/1602; B25J 9/1633; B25J 9/1664; B25J 9/00; B25J 9/16; B25J 9/0006; B62D 57/02; B62D 57/032; B62D 57/024; G05B 2219/40264; G05D 1/0891; G05D 2201/0217
See application file for complete search history.

(56) References Cited

U.S. PATENT DOCUMENTS

| | | | |
|---|---|---|---|
| 10,988,192 B1* | 4/2021 | Thorne | B62D 57/032 |
| 2011/0301756 A1* | 12/2011 | Yoshiike | B62D 57/032 |
| | | | 901/1 |

(Continued)

OTHER PUBLICATIONS

Hong, "Capture Point-Based Controller Using Real-Time Zero Moment Point Manipulation for Stable Bipedal Walking in Human Environment," Aug. 3, 2019 (Year: 2019).*

(Continued)

*Primary Examiner* — Adam R Mott
*Assistant Examiner* — Byron Xavier Kasper (57) ABSTRACT

A robot control method includes: determining a planned capture point and a measured capture point of the robot so as to calculate a capture point error of the robot; obtaining positions of a left foot and a right foot of the robot, and a planned zero moment point (ZMP) of the robot so as to calculate desired support forces of the left foot and the right foot; calculating desired torques of the left foot and the right foot according to the capture point error, the desired support forces of the left foot and the right foot; obtaining measured torques of the left foot and the right foot so as to calculate desired poses of the left foot and the right foot; and controlling the robot to walk according to the desired poses of the left foot and the desired pose of the right foot.

20 Claims, 6 Drawing Sheets

(56) References Cited

U.S. PATENT DOCUMENTS

2012/0316682 A1* 12/2012 Seo ................. B62D 57/032
901/1
2021/0009218 A1 1/2021 Huang et al.

OTHER PUBLICATIONS

Li et al., "Contact Force/Torque Control Based on Viscoelastic Model for Stable Bipedal Walking on Indefinite Uneven Terrain," Oct. 2019 (Year: 2019).*

* cited by examiner

CONTROL METHOD FOR ROBOT, COMPUTER-READABLE STORAGE MEDIUM AND ROBOT

CROSS REFERENCE TO RELATED APPLICATIONS

This application claims priority to Chinese Patent Application No. 202011551333.5, filed Dec. 24, 2020, which is hereby incorporated by reference herein as if set forth in its entirety.

BACKGROUND

1. Technical Field

The present disclosure generally relates to robots, and particularly to a control method for a robot, a computer-readable storage medium, and a robot.

2. Description of Related Art

The walking stability of biped robots has always been a challenging research topic. Various robot control methods have been proposed to achieve stable walking of biped robots on an even surface (i.e., ground, floor, etc.). However, in the case of an uneven terrain, some biped robots may have difficulty to walk stably, and may even fall over.

Therefore, there is a need to provide a robot control method to overcome above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The present disclosure provides a legged robot. For simplicity of description, unless otherwise specified, the robots mentioned in the embodiments of the present disclosure are biped robots.

Figure 1:
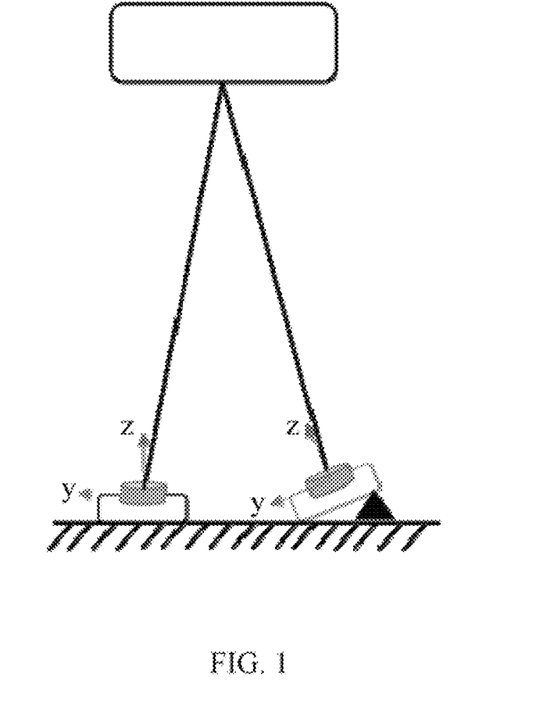
FIG. 1 is a schematic diagram of a biped robot according to one embodiment.

FIG. 1 shows a biped robot walking on a support surface (e.g., ground, floor surface, etc.) and stepping on an obstacle. The embodiments of the present disclosure use foot pose control as an effective means to allow the robot to walk stably on an uneven terrain. Flexible control of ankle joints can be achieved by using zero moment point (ZMP) tracking control such that the robot can adapt to changes in the terrain. In order not to affect the walking stability of the robot in the horizontal direction, and have a satisfactory response speed, capture point error is introduced to serve as a basis for calculating desired torques of feet of the robot. Specifically, the capture point error is calculated in real time through robot state estimation. According to a planned ZMP position, the support force distribution of the left and right feet can be determined, and the result of the support torque distribution of the left and right feet can then be calculated. Finally, the poses of the feet of the robot can be adjusted in real time through torque tracking, so as to realize the rapid adaptation of the feet to an uneven terrain.

Figure 2:
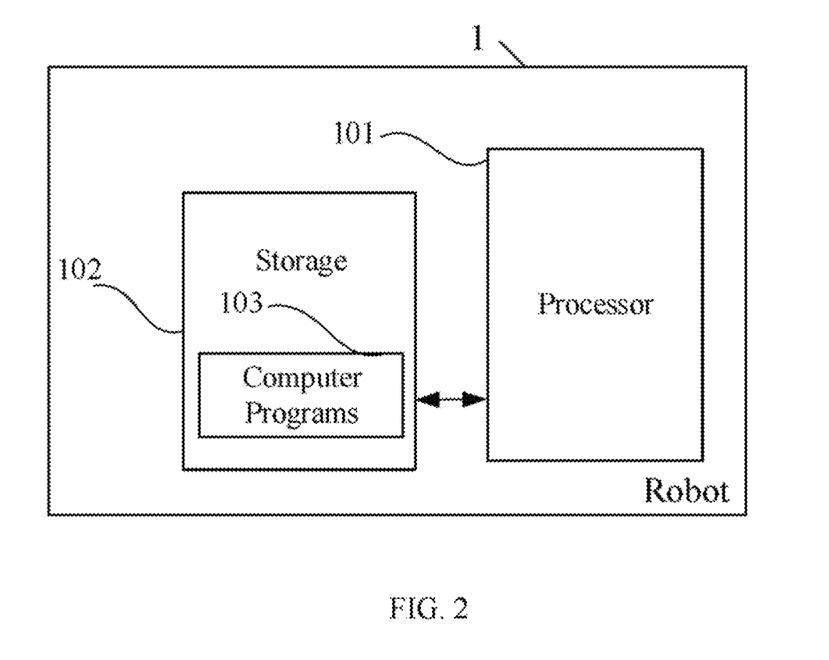
FIG. 2 is a schematic block diagram of the biped robot according to one embodiment.
Figure 3:
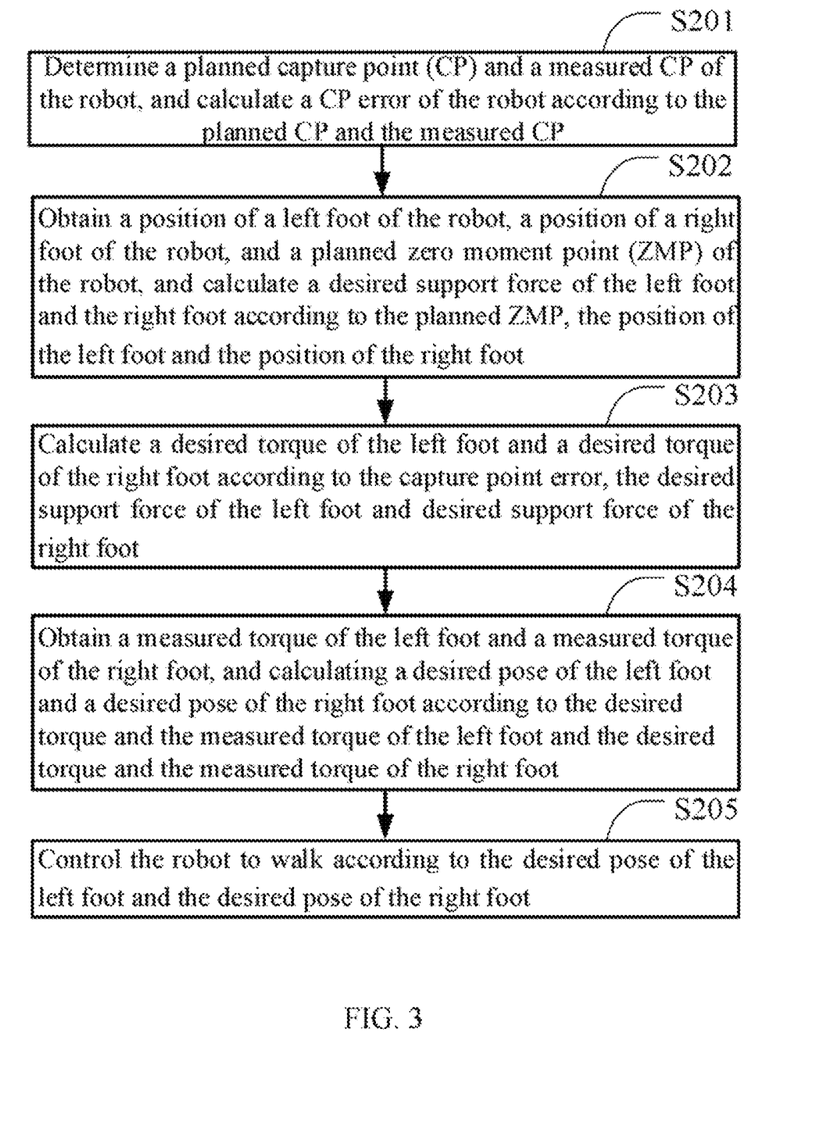
FIG. 3 is a schematic flowchart of a robot control method according to one embodiment.

FIG. 2 shows a schematic block diagram of the biped robot 1 according to one embodiment. The robot 1 may include a processor 101, a storage 102, and one or more executable computer programs 103 that are stored in the storage 102. The processor 101 is electrically connected to the storage 102, and performs corresponding operations by executing the executable computer programs 103 stored in the storage 102. When the processor 101 executes the computer programs 103, the steps in the embodiments of the method for controlling the robot 1, such as steps S201 through S205 in FIG. 3 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot 1, such as a hard disk or a memory. The storage 102 may also be an external storage device of the robot 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 6:
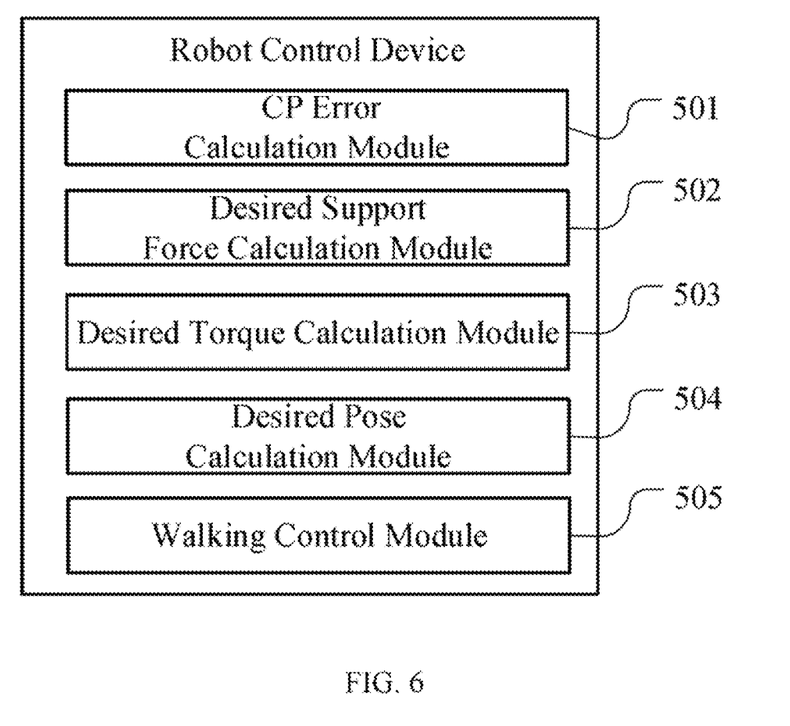
FIG. 6 is schematic block diagram of a robot control device according to embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 1. For example, the one or more computer programs 112 may be divided into a CP error calculation module 501, a desired support force calculation module 502, a desired torque calculation module 503, a desired pose calculation module 504, and a walking control module 505 as shown in FIG. 6.

FIG. 3 shows an exemplary flowchart of robot control method according to one embodiment. The method can be implemented to control the robot 1 shown in FIG. 1. In one embodiment, the method may include steps S201 to S205.

Step S201: Determine a planned capture point (CP) and a measured CP of the robot, and calculate a CP error of the robot according to the planned CP and the measured CP.

Generally, in robot planning and control, model simplification is usually used to map complex multi-rigid body systems. The most classic simplified model is the Linear inverted Pendulum Model (LIPM) shown in FIG. 4. Taking the sagittal plane of the robot as an example, the kinetic equation of LIPM in the x-axis direction (that is, the travelling direction of the robot) is as follows: $\ddot{x}_c = \omega^2(x_c - p_x)$, where $\ddot{x}_c$ represents speed of center of mass (CoM) of the robot, $x_c$ represents position of CoM of the robot, $p_x$ represents position of the ZMP of the robot, $\omega$ represents the natural frequency of LIPM and is equal to $\sqrt{g/Z_c}$, g represents the acceleration due to gravity, $Z_c$ represents the height of the CoM of the robot.

Figure 4:
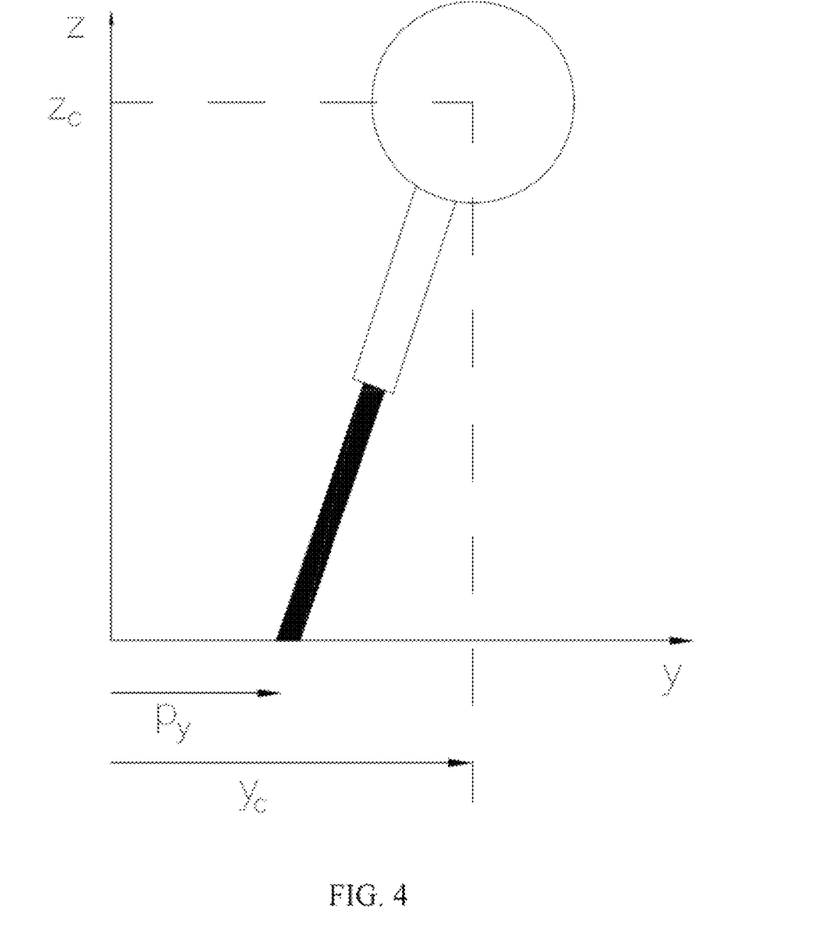
FIG. 4 is a schematic diagram of a linear inverted pendulum model (LIPM) according to one embodiment

The CP is an important concept in LIPM, and its physical meaning is a support point where the inverted pendulum is completely stationary. In other words, if the robot steps on the CP during walking, the center of mass of the robot can be completely stationary.

The CP is denoted by $\xi_x$, and can be calculated according to the following equation:

$$\xi_x = x_c + \frac{\dot{x}_c}{\omega},$$

where $\dot{x}_c$ represents speed of the CoM of the robot.

In the embodiment, the position and speed of the center of mass of the robot can be planned in advance using any proper conventional planning method according to actual needs. Here, the position and speed of the center of mass of the robot obtained by the planning are referred to as the center-of-mass planning position and the center-of-mass planning speed, respectively. After the center-of-mass planning position and center-of-mass planning speed are obtained in the planning, the CP (i.e., planned CP) can be calculated according to the following equation:

$$\xi_{plan\_x} = x_{plan} + \frac{\dot{x}_{plan}}{\omega},$$

where $x_{plan}$ represents the center-of-mass planning position and $\dot{x}_{plan}$ represents the center-of-mass planning speed.

The analysis process above in relation to the sagittal plane can also apply to the coronal plane of the robot. The planned CP (denoted by $\xi_{plan\_y}$) and measured CP (denoted by $\xi_{measure\_y}$) in the y-axis direction can be calculated in a manner similar to the process above. Here, the positive direction of the y-axis points away from the left side of the robot. That is, the positive direction of the y-axis is the direction that the robot faces after the robot has made a 90-degree turn to the left of the robot. The first and second components of the planned CP are denoted by $\xi_{plan\_x}$ and $\xi_{plan\_y}$, and the first and second components of the measured CP are denoted by $\xi_{measure\_x}$ and $\xi_{measure\_y}$.

After the planned CP and the measured CP are determined, the CP error can be calculated according to the following equations: $CP_{error\_x} = \xi_{plan\_x} - \xi_{measure\_x}$ and $CP_{error\_y} = \xi_{plan\_y} - \xi_{measure\_y}$, where $CP_{error\_x}$ represents the first component (i.e., the component in x-axis) of the CP error, and $CP_{error\_y}$ represents the second component (i.e., the component in y-axis) of the CP error.

Step S202: Obtain a position of a left foot of the robot, a position of a right foot of the robot, and a planned zero moment point (ZMP) of the robot, and calculate a desired support force of the left foot and a desired support force of the right foot according to the planned ZMP, the position of the left foot and the position of the right foot.

During the robot's gait generation process, the robot's ZMP will be planned to obtain the planned ZMP using any proper conventional planning method according to actual needs. In the coronal plane (y-axis direction), the support force distribution coefficient can be calculated according to planned ZMP, the position of the left foot and the position of the right foot using the following equation:

$$K_f = \frac{|p_{y_{plan}} - p_{lf}|}{|p_{lf} - p_{rf}|},$$

where $p_{y_{plan}}$ represents the planned ZMP, $p_{lf}$ represents the position of the left foot, and $p_{rf}$ represents the position of the right foot. It should be noted that since the desired ZMP may be located outside of the positions of the left and right feet, $K_f$ can be limited during actual use to ensure $0 \leq K_f \leq 1$.

Then, the desired support force of the left foot and the desired support force of the right foot can be calculated according to the supporting force distribution coefficient and the mass of the robot using the following equations: $f_{rd} = K_f M g$ and $f_{ld} = (1-K_f)Mg$, where M represents the mass of the robot, g represents acceleration due to gravity, $f_{ld}$ represents the desired support force of the left foot, and $f_{rd}$ represents the desired support force of the right foot. According to the equations above, the desired support force of the left or right foot is proportional to the distance between the ZMP and the left or right foot. That is, the closer one of the two feet to the ZMP is, the greater the desired support force of the one of the two feet is.

Step S203: Calculate a desired torque of the left foot and a desired torque of the right foot according to the capture point error, the desired support force of the left foot, and desired support force of the right foot.

In one embodiment, ankle joint torque control can be performed to eliminate the CP error as much as possible, that is, to establish a torque controller according to the following equation: $T = k*f*CP_{error}$, where k represents a preset torque controller parameter which can be set according to actual needs, T represents the desired torque, f represents the desired support force, and $CP_{error}$ represents the CP error.

In one embodiment, each ankle joint of the robot may include a front ankle joint and an ankle side joint. The front ankle joint is to adjust the pitch angle of an associated foot, and the ankle side joint is to adjust the roll angle of the associated foot.

In one embodiment, the desired torque of the left foot of the robot can be calculated according to the following equations: $T_{ldx} = k*f_{ld}*CP_{error\_y}$ and $T_{ldy} = k*f_{ld}*CP_{error\_x}$, where k represents the preset torque controller parameter, $f_{ld}$ represents the desired support force of the left foot, $CP_{error\_x}$ represents the first component of the capture point error, $CP_{error\_y}$ represents the second component of the capture point error, $T_{ldx}$ represents a first component of the desired torque of the left foot, and $T_{ldy}$ represents a second component of the desired torque of the left foot.

Similarly, the desired torque of the left foot of the robot can be calculated according to the following equations: $T_{rdx} = k*f_{rd}*CP_{error\_y}$ and $T_{rdy} = k*f_{rd}*CP_{error\_x}$, where $f_{rd}$ represents the desired support force of the right foot, $T_{rdx}$ represents a first component of the desired torque of the right foot, and $T_{rdy}$ represents a second component of the desired torque of the right foot.

Step S204: Obtain a measured torque of the left foot and a measured torque of the right foot, and calculating a desired pose of the left foot and a desired pose of the right foot according to the desired torque and the measured torque of the left foot and the desired torque and the measured torque of the right foot.

In one embodiment, the actual torque of the left foot and right foot of the robot can be measured by the six-dimensional force sensor. Here, they are referred to as the measured torque of the left foot and the right foot, respectively.

Figure 5:
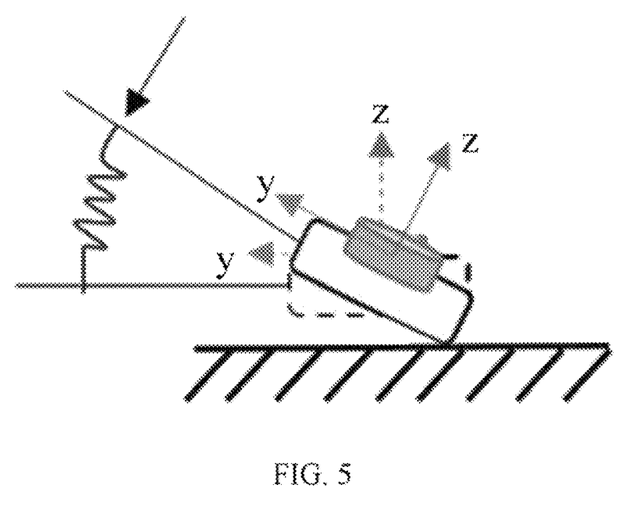
FIG. 5 is a schematic diagram of a rotating spring model that is equivalent to the rotation of an ankle side joint according to one embodiment.

Taking the ankle side joint of the left foot as an example, the rotation of the ankle side joint can be equivalent to a rotating spring model shown in FIG. 5. Based on this spring model, a pose controller for the ankle side joint of the left can be designed according to the following equation: $\ddot{Roll}_{lx}=K_p(T_{ldx}-T_{lmx})-K_s \dot{Roll}_{lx}$, where $K_p$ represents a preset damping parameter and $K_s$ represents a preset stiffness parameter, which can be set to proper values according to actual needs; $T_{lmx}$ represents a first component of the measured torque of the left foot, which is the actual torque of the ankle side joint of the left foot; $Roll_{lx}$ represents a roll angle of the desired pose of the left foot, and is the desired pose angle of the ankle side joint of the left foot; and $\dot{Roll}_{lx}$ is the derivative of $Roll_{lx}$ and represents an angular speed of the left foot about a roll axis. The value of $Roll_{lx}$ can be obtained by solving the equation above.

Similarly, a pose controller for the ankle front joint of the left foot can be designed based on this spring model according to the following equation; $\ddot{Pitch}_{ly}=K_p(T_{ldy}-T_{lmy})-K_s \dot{Pitch}_{ly}$, where $T_{lmy}$ represents a second component of the measured torque of the left foot, which is the actual torque of the ankle front joint of the left foot; $Pitch_{ly}$ represents a pitch angle of the desired pose of the left foot and is the desired pose angle of the ankle front joint of the left foot; $\dot{Pitch}_{ly}$ is derivative of $Pitch_{ly}$ and represents an angular speed of the left foot about a pitch axis. The value of $Pitch_{ly}$ can be obtained by solving the equation above.

Similarly, a pose controller for the ankle side joint of the right foot can be designed based on this spring model according to the following equation: $\ddot{Roll}_{rx}=K_p(T_{rdx}-T_{rmx})-K_s \dot{Roll}_{rx}$, where $T_{rmx}$ represents a first component of the measured torque of the right foot, which is the actual torque of the ankle side joint of the right foot; $Roll_{rx}$ represents a roll angle of the desired pose of the right foot, and is the desired pose angle of the ankle side joint of the right foot; $\dot{Roll}_{rx}$ is the derivative of $Roll_{rx}$ and represents an angular speed of the right foot about a roll axis. The value of $Roll_{rx}$ can be obtained by solving the equation above.

Similarly, a pose controller for the ankle front joint of the right foot can be designed based on this spring model according to the following equation: $\ddot{Pitch}_{ry}=K_p(T_{rdy}-T_{rmy})-K_s \dot{Pitch}_{ry}$, where $T_{rmy}$ represents a second component of the measured torque of the right foot, which is the actual torque of the ankle front joint of the right foot; $Pitch_{ry}$ represents a pitch angle of the desired pose of the right foot, and is the desired pose angle of the ankle front joint of the right foot; and $\dot{Pitch}_{ry}$ is derivative of $Pitch_{ry}$ and represents an angular speed of the right foot about a pitch axis. The value of $Pitch_{ry}$ can be obtained by solving the equation above.

Step S205: Control the robot to walk according to the desired pose of the left foot and the desired pose of the right foot.

According to the robot control method described in the embodiments of the present disclosure above, the capture point error of the robot is calculated in real time. According to a planned ZMP position, the support force distribution of the left and right feet can be determined, and the result of the support torque distribution of the left and right feet can then be calculated. Finally, the poses of the feet of the robot can be adjusted in real time through torque tracking, so as to realize the rapid adaptation of the feet to an uneven terrain.

It should be noted that, the sequence numbers of the foregoing procedures do not imply an execution sequence, and the execution sequence of the procedures should be determined according to their functions and internal logic, which is not intended to limit an implementation procedure of the embodiments of the present disclosure.

Referring to FIG. 6, in one embodiment, a robot control device may include a CP error calculation module 501, a desired support force calculation module 502, a desired torque calculation module 503, a desired pose calculation module 504, and a walking control module 505. The CP error calculation module 501 is to determine a planned capture point (CP) and a measured CP of the robot, and calculate a CP error of the robot according to the planned CP and the measured CP. The desired support force calculation module 502 is to obtain a position of a left foot of the robot, a position of a right foot of the robot, and a planned zero moment point (ZMP) of the robot, and calculate a desired support force of the left foot and a desired support force of the right foot according to the planned ZMP, the position of the left foot and the position of the right foot. The desired torque calculation module 503 is to calculate a desired torque of the left foot and a desired torque of the right foot according to the capture point error, the desired support force of the left foot, and desired support force of the right foot. The desired pose calculation module 504 is to obtain a measured torque of the left foot and a measured torque of the right foot, and calculating a desired pose of the left foot and a desired pose of the right foot according to the desired torque and the measured torque of the left foot and the desired torque and the measured torque of the right foot. The walking control module 505 is to control the robot to walk according to the desired pose of the left foot and the desired pose of the right foot.

In one embodiment, the desired support force calculation module 502 may include a distribution coefficient calculation unit and a desired support force calculation unit. The distribution coefficient calculation unit is to calculate a support force distribution coefficient according to the planned ZMP, the position of the left foot and the position of the right foot. The desired support force calculation unit is to calculate the desired support force of the left foot and the desired support force of the right foot according to the supporting force distribution coefficient and a mass of the robot.

In one embodiment, the support force distribution coefficient is calculated according to the following equation:

$$K_f = \frac{|p_{y_{plan}} - p_{lf}|}{|p_{lf} - p_{rf}|},$$

where $p_{y_{plan}}$ represents the planned ZMP, $p_{lf}$ represents the position of the left foot, and $p_{rf}$ represents the position of the right foot.

In one embodiment, the desired support force of the left foot and the desired support force of the right foot are calculated according to the following equations: $f_{rd}=K_f Mg$ and $f_{ld}=(1-K_f)Mg$, where $K_f$ represents the support force distribution coefficient, M represents the mass of the robot, g represents acceleration due to gravity, $f_{ld}$ represents the desired support force of the left foot, and $f_{rd}$ represents the desired support force of the right foot.

In one embodiment, the desired torque of the left foot and the desired torque of the right foot are calculated according to the following equations: $T_{ldx}=k*f_{ld}*CP_{error\_y}$, $T_{ldy}=k*f_{ld}*CP_{error\_x}$, $T_{rdx}=k*f_{rd}*CP_{error\_y}$, and $T_{rdy}=k*f_{rd}*CP_{error\_x}$, where k represents a preset torque controller parameter, $f_{ld}$ represents the desired support force of the left foot, and $f_{rd}$ represents the desired support force of the right foot, $CP_{error\_x}$ represents a first component of the capture point error, $CP_{error\_y}$ represents a second component of the capture point error, $T_{ldx}$ represents a first component of the desired torque of the left foot, $T_{ldy}$ represents a second component of the desired torque of the left foot, $T_{rdx}$ represents a first component of the desired torque of the right foot, and $T_{rdy}$ represents a second component of the desired torque of the right foot.

In one embodiment, the desired pose of the left foot and the desired pose of the right foot are calculated according to the following equations: $\mathrm{R\ddot{o}ll}_{lx}=K_p(T_{ldx}-T_{lmx})-K_s \mathrm{Roll}_{lx}$, $\mathrm{Pitch}_{ly}=K_p(T_{ldy}-T_{lmy})-K_s \mathrm{Pitch}_{ly}$, $\mathrm{R\ddot{o}ll}_{rx}=K_p(T_{rdx}-T_{rmx})-K_s \mathrm{Roll}_{rx}$, and $\mathrm{Pitch}_{ry}=K_p(T_{rdy}-T_{rmy})-K_s \mathrm{Pitch}_{ry}$, where $K_p$ represents a preset damping parameter, $K_s$ represents a preset stiffness parameter, $T_{ldx}$ represents a first component of the desired torque of the left foot, $T_{ldy}$ represents a second component of the desired torque of the left foot, $T_{rdx}$ represents a first component of the desired torque of the right foot, and $T_{rdy}$ represents a second component of the desired torque of the right foot, $T_{lmx}$ represents a first component of the measured torque of the left foot, $T_{lmy}$ represents a second component of the measured torque of the left foot, $T_{rmx}$ represents a first component of the measured torque of the right foot, and $T_{rmy}$ represents a second component of the measured torque of the right foot, $\mathrm{Roll}_{lx}$ represents a roll angle of the desired pose of the left foot, $\mathrm{R\ddot{o}ll}_{lx}$ represents an angular speed of the left foot about a roll axis, $\mathrm{Pitch}_{ly}$ represents a pitch angle of the desired pose of the left foot, $\mathrm{Pitch}_{ly}$ represents an angular speed of the left foot about a pitch axis, $\mathrm{Roll}_{rx}$ represents a roll angle of the desired pose of the right foot, $\mathrm{R\ddot{o}ll}_{rx}$ represents an angular speed of the right foot about a roll axis, $\mathrm{Pitch}_{ry}$ represents a pitch angle of the desired pose of the right foot, and $\mathrm{Pitch}_{ry}$ represents an angular speed of the right foot about a pitch axis.

In one embodiment, the capture point error is calculated according to the following equations: $CP_{error\_x}=\xi_{plan\_x}-\xi_{measure\_x}$ and $CP_{error\_y}=\xi_{plan\_y}-\xi_{measure\_y}$, where $\xi_{plan\_x}$ represents a first component of the planned capture point, $\xi_{plan\_y}$ represents a second component of the planned capture point, $\xi_{measure\_x}$ represents a first component of the measured capture point, $\xi_{measure\_y}$ represents a second component of the measured capture point, $CP_{error\_x}$ represents a first component of the capture point error, and $CP_{error\_y}$ represents a second component of the capture point error.

A person having ordinary skill in the art may clearly understand that, for the convenience and conciseness of description, the specific working processes of the above-described devices, modules and units can refer to the corresponding processes in the foregoing method embodiments, and will not be repeated here.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented control method for a robot, comprising:

determining a planned capture point and a measured capture point of the robot, and calculating a capture point error of the robot according to the planned capture point and the measured capture point;

obtaining a position of a left foot of the robot, a position of a right foot of the robot, and a planned zero moment point (ZMP) of the robot, and calculating a desired support force of the left foot and a desired support force of the right foot according to the planned ZMP, the position of the left foot and the position of the right foot;

calculating a desired torque of the left foot and a desired torque of the right foot according to the capture point error, the desired support force of the left foot, and the desired support force of the right foot;

obtaining a measured torque of the left foot and a measured torque of the right foot, and calculating a desired pose of the left foot and a desired pose of the right foot according to the desired torque and the measured torque of the left foot and the desired torque and the measured torque of the right foot; and controlling the robot to walk according to the desired pose of the left foot and the desired pose of the right foot;

wherein the desired pose of the left foot and the desired pose of the right foot are calculated according to the following equations:

$$\ddot{\text{Roll}}_{lx}=K_p(T_{ldx}-T_{lmx})-K_s\dot{\text{Roll}}_{lx},$$

$$\ddot{\text{Pitch}}_{ly}=K_p(T_{ldy}-T_{lmy})-K_s\dot{\text{Pitch}}_{ly},$$

$$\ddot{\text{Roll}}_{rx}=K_p(T_{rdx}-T_{rmx})-K_s\dot{\text{Roll}}_{rx}, \text{ and}$$

$$\ddot{\text{Pitch}}_{ry}=K_p(T_{rdy}-T_{rmy})-K_s\dot{\text{Pitch}}_{ry},$$

where $K_p$ represents a preset damping parameter, $K_s$ represents a preset stiffness parameter, $T_{ldx}$ represents a first component of the desired torque of the left foot, $T_{ldy}$ represents a second component of the desired torque of the left foot, $T_{rdx}$ represents a first component of the desired torque of the right foot, and $T_{rdy}$ represents a second component of the desired torque of the right foot, $T_{lmx}$ represents a first component of the measured torque of the left foot, $T_{lmy}$ represents a second component of the measured torque of the left foot, $T_{rmx}$ represents a first component of the measured torque of the right foot, and $T_{rmy}$ represents a second component of the measured torque of the right foot, $\text{Roll}_{lx}$ represents a roll angle of the desired pose of the left foot, $\dot{\text{Roll}}_{lx}$ represents an angular speed of the left foot about a roll axis, $\text{Pitch}_{ly}$ represents a pitch angle of the desired pose of the left foot, $\dot{\text{Pitch}}_{ly}$ represents an angular speed of the left foot about a pitch axis, $\text{Roll}_{rx}$ represents a roll angle of the desired pose of the right foot, $\dot{\text{Roll}}_{rx}$ represents an angular speed of the right foot about a roll axis, $\text{Pitch}_{ry}$ represents a pitch angle of the desired pose of the right foot, and $\dot{\text{Pitch}}_{ry}$ represents an angular speed of the right foot about a pitch axis.

2. The method of claim 1, wherein calculating the desired support force of the left foot and the desired support force of the right foot comprises:

calculating a support force distribution coefficient according to the planned ZMP, the position of the left foot, and the position of the right foot; and calculating the desired support force of the left foot and the desired support force of the right foot according to the supporting force distribution coefficient and a mass of the robot.

3. The method of claim 2, wherein the support force distribution coefficient is calculated according to the following equation:

$$K_f = \frac{|p_{y_{plan}} - p_{lf}|}{|p_{lf} - p_{rf}|},$$

where $p_{y_{plan}}$ represents the planned ZMP, $p_{lf}$ represents the position of the left foot, and $p_{rf}$ represents the position of the right foot.

4. The method of claim 2, wherein the desired support force of the left foot and the desired support force of the right foot are calculated according to the following equations: $f_{rd}=K_fMg$ and $f_{ld}=(1-K_f)Mg$, where $K_f$ represents the support force distribution coefficient, M represents the mass of the robot, g represents acceleration due to gravity, $f_{ld}$ represents the desired support force of the left foot, and $f_{rd}$ represents the desired support force of the right foot.

5. The method of claim 1, wherein the capture point error is calculated according to the following equations: $CP_{error\_x} = \xi_{plan\_x} - \xi_{measure\_x}$ and $CP_{error\_y} = \xi_{plan\_y} - \xi_{measure\_y}$, where $\xi_{plan\_x}$ represents a first component of the planned capture point, $\xi_{plan\_y}$ represents a second component of the planned capture point, $\xi_{measure\_x}$ represents a first component of the measured capture point, $\xi_{measure\_y}$ represents a second component of the measured capture point, $CP_{error\_x}$ represents a first component of the capture point error, and $CP_{error\_y}$ represents a second component of the capture point error.

6. A robot comprising:
one or more processors;
a memory; and
one or more programs, wherein the one or more programs are stored in the memory and configured to be executed by the one or more processors, the one or more programs comprises:
instructions for determining a planned capture point and a measured capture point of the robot, and calculating a capture point error of the robot according to the planned capture point and the measured capture point;
instructions for obtaining a position of a left foot of the robot, a position of a right foot of the robot, and a planned zero moment point (ZMP) of the robot, and calculating a desired support force of the left foot and a desired support force of the right foot according to the planned ZMP, the position of the left foot and the position of the right foot;
instructions for calculating a desired torque of the left foot and a desired torque of the right foot according to the capture point error, the desired support force of the left foot, and the desired support force of the right foot;
instructions for obtaining a measured torque of the left foot and a measured torque of the right foot, and calculating a desired pose of the left foot and a desired pose of the right foot according to the desired torque and the measured torque of the left foot and the desired torque and the measured torque of the right foot; and
instructions for controlling the robot to walk according to the desired pose of the left foot and the desired pose of the right foot;
wherein the desired pose of the left foot and the desired pose of the right foot are calculated according to the following equations:

$Roll_{lx} = K_p(T_{ldx} - T_{lmx}) - K_s Roll_{lx}$, $Pitch_{ly} = K_p(T_{ldy} - T_{lmy}) - K_s Pitch_{ly}$, $Roll_{rx} = K_p(T_{rdx} - T_{rmx}) - K_s Roll_{rx}$, and $Pitch_{ry} = K_p(T_{rdy} - T_{rmy}) - K_s Pitch_{ry}$, where $K_p$ represents a preset damping parameter, $K_s$ represents a preset stiffness parameter, $T_{ldx}$ represents a first component of the desired torque of the left foot, $T_{ldy}$ represents a second component of the desired torque of the left foot, $T_{rdx}$ represents a first component of the desired torque of the right foot, and $T_{rdy}$ represents a second component of the desired torque of the right foot, $T_{lmx}$ represents a first component of the measured torque of the left foot, $T_{lmy}$ represents a second component of the measured torque of the left foot, $T_{rmx}$ represents a first component of the measured torque of the right foot, and $T_{rmy}$ represents a second component of the measured torque of the right foot, $Roll_{lx}$ represents a roll angle of the desired pose of the left foot, $\dot{Roll}_{lx}$ represents an angular speed of the left foot about a roll axis, $Pitch_{ly}$ represents a pitch angle of the desired pose of the left foot, $\dot{Pitch}_{ly}$ represents an angular speed of the left foot about a pitch axis, $Roll_{rx}$ represents a roll angle of the desired pose of the right foot, $\dot{Roll}_{rx}$ represents an angular speed of the right foot about a roll axis, $Pitch_{ry}$ represents a pitch angle of the desired pose of the right foot, and $\dot{Pitch}_{ry}$ represents an angular speed of the right foot about a pitch axis.

7. The robot of claim 6, wherein the instructions for calculating the desired support force of the left foot and the desired support force of the right foot comprise:
instructions calculating a support force distribution coefficient according to the planned ZMP, the position of the left foot, and the position of the right foot; and
instructions calculating the desired support force of the left foot and the desired support force of the right foot according to the supporting force distribution coefficient and a mass of the robot.

8. The robot of claim 7, wherein the support force distribution coefficient is calculated according to the following equation:

$$K_f = \frac{|p_{y_{plan}} - p_{lf}|}{|p_{lf} - p_{rf}|},$$

where $p_{y_{plan}}$ represents the planned ZMP, $p_{lf}$ represents the position of the left foot, and $p_{rf}$ represents the position of the right foot.

9. The robot of claim 7, wherein the desired support force of the left foot and the desired support force of the right foot are calculated according to the following equations:
$f_{rd} = K_f Mg$ and $f_{ld} = (1 - K_f)Mg$, where $K_f$ represents the support force distribution coefficient, M represents the mass of the robot, g represents acceleration due to gravity, $f_{ld}$ represents the desired support force of the left foot, and $f_{rd}$ represents the desired support force of the right foot.

10. The method of claim 6, wherein the capture point error is calculated according to the following equations: $CP_{error\_x} = \xi_{plan\_x} - \xi_{measure\_x}$ and $CP_{error\_y} = \xi_{plan\_y} - \xi_{measure\_y}$, where $\xi_{plan\_x}$ represents a first component of the planned capture point, $\xi_{plan\_y}$ represents a second component of the planned capture point, $\xi_{measure\_x}$ represents a first component of the measured capture point, $\xi_{measure\_y}$ represents a second component of the measured capture point, $CP_{error\_x}$ represents a first component of the capture point error, and $CP_{error\_y}$ represents a second component of the capture point error.

11. A non-transitory computer-readable storage medium storing one or more programs to be executed in a robot, the one or more programs, when being executed by one or more processors of the robot, causing the robot to perform processing comprising:
determining a planned capture point and a measured capture point of the robot, and calculating a capture point error of the robot according to the planned capture point and the measured capture point;
obtaining a position of a left foot of the robot, a position of a right foot of the robot, and a planned zero moment point (ZMP) of the robot, and calculating a desired support force of the left foot and a desired support force of the right foot according to the planned ZMP, the position of the left foot and the position of the right foot;

calculating a desired torque of the left foot and a desired torque of the right foot according to the capture point error, the desired support force of the left foot, and the desired support force of the right foot;

obtaining a measured torque of the left foot and a measured torque of the right foot, and calculating a desired pose of the left foot and a desired pose of the right foot according to the desired torque and the measured torque of the left foot and the desired torque and the measured torque of the right foot; and controlling the robot to walk according to the desired pose of the left foot and the desired pose of the right foot;

wherein the desired pose of the left foot and the desired pose of the right foot are calculated according to the following equations:

$$Röll_{lx}=K_p(T_{ldx}-T_{lmx})-K_s Roll_{lx},$$

$$Pitch_{ly}=K_p(T_{ldy}-T_{lmy})-K_s Pitch_{ly},$$

$$Röll_{rx}=K_p(T_{rdx}-T_{rmx})-K_s Roll_{rx}, \text{ and}$$

$$Pitch_{ry}=K_p(T_{rdy}-T_{rmy})-K_s Pitch_{ry},$$

where $K_p$ represents a preset damping parameter, $K_s$ represents a preset stiffness parameter, $T_{ldx}$ represents a first component of the desired torque of the left foot, $T_{ldy}$ represents a second component of the desired torque of the left foot, $T_{rdx}$ represents a first component of the desired torque of the right foot, and $T_{rdy}$ represents a second component of the desired torque of the right foot, $T_{lmx}$ represents a first component of the measured torque of the left foot, $T_{lmy}$ represents a second component of the measured torque of the left foot, $T_{rmx}$ represents a first component of the measured torque of the right foot, and $T_{rmy}$ represents a second component of the measured torque of the right foot, $Roll_{lx}$ represents a roll angle of the desired pose of the left foot, $Röll_{lx}$ represents an angular speed of the left foot about a roll axis, $Pitch_{ly}$ represents a pitch angle of the desired pose of the left foot, $Pitch_{ry}$ represents an angular speed of the left foot about a pitch axis, $Roll_{rx}$ represents a roll angle of the desired pose of the right foot, $Röll_{rx}$ represents an angular speed of the right foot about a roll axis, $Pitch_{ry}$ represents a pitch angle of the desired pose of the right foot, and $Pitch_{ry}$ represents an angular speed of the right foot about a pitch axis.

12. The non-transitory computer-readable storage medium of claim 11, wherein calculating the desired support force of the left foot and the desired support force of the right foot comprises:

calculating a support force distribution coefficient according to the planned ZMP, the position of the left foot, and the position of the right foot; and calculating the desired support force of the left foot and the desired support force of the right foot according to the supporting force distribution coefficient and a mass of the robot.

13. The non-transitory computer-readable storage medium of claim 12, wherein the support force distribution coefficient is calculated according to the following equation:

$$K_f = \frac{|p_{y_{plan}} - p_{lf}|}{|p_{lf} - p_{rf}|},$$

where $p_{y_{plan}}$ represents the planned ZMP, $p_{lf}$ represents the position of the left foot, and $p_{rf}$ represents the position of the right foot.

14. The non-transitory computer-readable storage medium of claim 12, wherein the desired support force of the left foot and the desired support force of the right foot are calculated according to the following equations: $f_{rd}=K_f Mg$ and $f_{ld}=(1-K_f)Mg$, where $K_f$ represents the support force distribution coefficient, M represents the mass of the robot, g represents acceleration due to gravity, $f_{ld}$ represents the desired support force of the left foot, and $f_{rd}$ represents the desired support force of the right foot.

15. The non-transitory computer-readable storage medium of claim 11, wherein the capture point error is calculated according to the following equations:

$$CP_{error\_x}=\xi_{plan\_x}-\xi_{measure\_x} \text{ and } CP_{error\_y}=\xi_{plan\_y}-\xi_{measure\_y},$$

where $\xi_{plan\_x}$ represents a first component of the planned capture point, $\xi_{plan\_y}$ represents a second component of the planned capture point, $\xi_{measure\_x}$ represents a first component of the measured capture point, $\xi_{measure\_y}$ represents a second component of the measured capture point, $CP_{error\_x}$ represents a first component of the capture point error, and $CP_{error\_y}$ represents a second component of the capture point error.

16. The non-transitory computer-readable storage medium of claim 11, wherein determining the planned capture point of the robot comprises:

planning a position and a speed of a center of mass of the robot as a center-of-mass planning position and a center-of-mass planning speed, respectively; and determining the planned capture point of the robot based on the center-of-mass planning position, the center-of-mass planning speed, and a natural frequency of linear inverted pendulum model.

17. The non-transitory computer-readable storage medium of claim 11, wherein the capture point error of the robot is calculated according to the following equations:

$$CP_{error\_x}=\xi_{plan\_x}-\xi_{measure\_x};$$

$$CP_{error\_y}=\xi_{plan\_y}-\xi_{measure\_y};$$

where, $CP_{error\_x}$ represents a first component of the capture point error of the robot, and $CP_{error\_y}$ represents a second component of the capture point error of the robot, $\xi_{plan\_x}$ represents a first component of the planned capture point, $\xi_{plan\_y}$ represents a second component of the planned capture point, $\xi_{measure\_x}$ represents a first component of the measured capture point, and $\xi_{measure\_y}$ represents a second component of the measured capture point.

18. The non-transitory computer-readable storage medium of claim 17, wherein the first component of the capture point error of the robot is a component in x-axis of the capture point error of the robot, and the second component of the capture point error of the robot is a component in y-axis of the capture point error of the robot; and wherein the x-axis corresponds to travelling direction of the robot, and a positive direction of the y-axis points away from a left side of the robot.

19. The robot of claim 6, wherien determining the planned capture point of the robot comprises:
- planning a position and a speed of a center of mass of the robot as a center-of-mass planning position and a center-of-mass planning speed, respectively; and
- determining the planned capture point of the robot based on the center-of-mass planning position, the center-of-mass planning speed, and a natural frequency of linear inverted pendulum model.

20. The robot of claim 6, wherien the capture point error of the robot is calculated according to the following equations:

$$CP_{error\_x} = \xi_{plan\_x} - \xi_{measure\_x};$$

$$CP_{error\_y} = \xi_{plan\_y} - \xi_{measure\_y};$$

where, $CP_{error\_x}$ represents a first component of the capture point error of the robot, and $CP_{error\_y}$ represents a second component of the capture point error of the robot, $\xi_{plan\_x}$ represents a first component of the planned capture point, $\xi_{plan\_y}$ represents a second component of the planned capture point, $\xi_{measure\_x}$ represents a first component of the measured capture point, and $\xi_{measure\_y}$ represents a second component of the measured capture point.

* * * * *